(12) United States Patent
Abe et al.

(10) Patent No.: US 12,473,412 B2
(45) Date of Patent: Nov. 18, 2025

(54) GRAPHIC SHEET AND LIGHTING SYSTEM USING GRAPHIC SHEET

(71) Applicant: 3M INNOVATIVE PROPERTIES COMPANY, St. Paul, MN (US)

(72) Inventors: Hidetoshi Abe, Yamagata (JP); Koji Saito, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 1260 days.

(21) Appl. No.: 17/279,154

(22) PCT Filed: Sep. 26, 2019

(86) PCT No.: PCT/IB2019/058199
§ 371 (c)(1),
(2) Date: Mar. 24, 2021

(87) PCT Pub. No.: WO2020/065591
PCT Pub. Date: Apr. 2, 2020

(65) Prior Publication Data
US 2021/0395475 A1    Dec. 23, 2021

(30) Foreign Application Priority Data

Sep. 27, 2018 (JP) .................................. 2018-181114

(51) Int. Cl.
*C08J 7/04* (2020.01)
*C08K 3/22* (2006.01)
(Continued)

(52) U.S. Cl.
CPC ............. *C08J 7/0427* (2020.01); *C08J 7/042* (2013.01); *C08K 3/22* (2013.01); *C08K 7/16* (2013.01);
(Continued)

(58) Field of Classification Search
CPC ...... C08J 7/0427; C08J 7/042; C08J 2367/00; C08J 2433/14; C08K 3/22; C08K 7/16;
(Continued)

(56) References Cited

U.S. PATENT DOCUMENTS

2004/0080960 A1* 4/2004 Wu ......................... G09F 13/22
                                                        362/555
2011/0268897 A1   11/2011 Klemann
2021/0395475 A1* 12/2021 Abe ....................... C09D 11/36

FOREIGN PATENT DOCUMENTS

JP     2002059640      2/2002
JP     2002178627      6/2002
(Continued)

OTHER PUBLICATIONS

KR 20180078072 A Machine Translation (Year: 2018).*
WO 2017061634 A1 Machine Translation (Year: 2017).*
International Search Report for PCT International Application No. PCT/IB2019/058199, mailed on Feb. 7, 2020, 3 pages.

*Primary Examiner* — Betelhem Shewareged
(74) *Attorney, Agent, or Firm* — Julie Lapos-Kuchar; Daniel Iden

(57) ABSTRACT

A graphic sheet including: a transparent rigid film substrate; and a receptor layer disposed on the transparent rigid film substrate, the receptor layer containing an acrylic polymer and a white pigment filler; wherein the receptor layer contains not less than 5 parts by mass and not more than 50 parts by mass of the white pigment filler per 100 parts by mass of the acrylic polymer; and a total visible light transmittance of the sheet is not less than 8% and not greater than 50% is described.

17 Claims, 1 Drawing Sheet

(51) Int. Cl.
 *C08K 7/16* (2006.01)
 *C09D 11/36* (2014.01)
 *G09F 13/04* (2006.01)
 *G09F 13/22* (2006.01)

(52) U.S. Cl.
 CPC .......... *C09D 11/36* (2013.01); *G09F 13/0418* (2021.05); *G09F 13/22* (2013.01); *C08J 2367/00* (2013.01); *C08J 2433/14* (2013.01); *C08K 2003/2241* (2013.01)

(58) Field of Classification Search
 CPC ............ C08K 2003/2241; C09D 11/36; G09F 13/0418; G09F 13/22
 USPC ....................................................... 428/195.1
 See application file for complete search history.

(56) References Cited

FOREIGN PATENT DOCUMENTS

| | | | |
|---|---|---|---|
| JP | 2006088593 A | * | 4/2006 |
| JP | 3963574 | | 8/2007 |
| JP | 201044156 | | 2/2010 |
| JP | 2011152930 | | 8/2011 |
| JP | 2013199578 | | 10/2013 |
| JP | 5596291 | | 9/2014 |
| JP | 201685289 | | 5/2016 |
| KR | 1020180078072 | | 7/2018 |
| WO | WO 2011-092927 | | 8/2011 |
| WO | WO 2012-074324 | | 6/2012 |
| WO | WO 2017-061634 | | 4/2017 |

* cited by examiner

GRAPHIC SHEET AND LIGHTING SYSTEM USING GRAPHIC SHEET

TECHNICAL FIELD

The present invention relates to a graphic sheet that can be attached to a lighting unit and used as an internally lit signboard or the like, and a lighting system using the graphic sheet.

BACKGROUND ART

Internally lit signboards such as various advertisements, guide displays, and company name displays in which a graphic sheet or the like is attached to a lighting unit are used indoors and outdoors. When these internally lit signboards are used outdoors, they are primarily used under natural light without turning on the internal light source within the lighting unit during the day, and are used at night by turning on the light source inside the lighting unit. In addition, when these internally lit signboards are used indoors, they may be used under indoor lighting or used by turning on the light source inside the lighting unit (internal lighting).

Patent Document 1 describes a graphics structure for an internally lit signboard that can be used with both internal and external lighting, "including a receptor layer, a printed layer produced by printing onto the receptor layer, and an acrylic white adhesive layer made of an acrylic white adhesive in this order, wherein the acrylic white adhesive contains a carboxyl group-containing (meth)acrylic polymer, from 8 to 150 parts by mass of a white pigment per 100 parts by mass of the carboxyl group-containing (meth)acrylic polymer, and an amino group-containing (meth)acrylic polymer not containing an aromatic vinyl monomer".

Patent Document 2 describes "a white polyester film for a recording material of an internally lit electric signboard, wherein the total light transmittance of the film is in a range of from 30 to 50%; the b-value of the Lab color system is in a range of from −4 to 5; and the two-dimensional arithmetic average roughness is in a range of from 21 to 50 nm".

Patent Document 1: Japanese Pat. Appl. Publ. No. 2009-282471

Patent Document 2: Japanese Pat. Appl. Publ. No. 2013-199578

SUMMARY OF INVENTION

Technical Problem

A graphic sheet for an internally lit signboard used both with internal and external lighting preferably yields a graphic image with little difference in color density between when the graphic sheet is used with external lighting and when the graphic sheet is used with internal lighting. In addition, when used with internal lighting, it is preferable for hot spots, which are caused by the presence of a light source when a light source of the lighting unit installed internally is turned on, to be inconspicuous on the graphic sheet screen. Therefore, the idea of whitening the substrate film layer or adhesive layer constituting the graphic sheet has been investigated.

On the other hand, in recent years, there has been an increase in opportunities to project various advertisement photographic images including facial photographs or the like of people. As a result, there is a demand for clarity to reproduce a graphic image such as a facial photograph of a person with precision and color similar to those of a silver halide photograph. The whiteness of a graphic sheet obtained by whitening the substrate film layer or the adhesive layer has an effect on the clarity of the graphic image of the internally lit signboard, so to enhance the graphic image of the internally lit signboard, it is preferable to further enhance the whiteness of the background image serving as a base for the printed image. In addition, in the case of an internally lit signboard for advertisement applications, it is also necessary to replace the graphic image within a short period of time, so there is also a demand for ease of handling so that the graphic sheet can be replaced more easily.

Solution to Problem

The graphic sheet of the present invention includes: a transparent rigid transparent rigid film substrate; and a receptor layer disposed on the transparent rigid film substrate, the receptor layer containing an acrylic polymer and a white pigment filler. The receptor layer contains not less than 5 parts by mass and not more than 50 parts by mass of the white pigment filler per 100 parts by mass of the acrylic polymer; and the total visible light transmittance of the sheet is not less than 8% and not greater than 50%.

In addition, the lighting system of the present invention includes the graphic sheet of the present invention and a lighting unit, wherein the graphic sheet is attached to the lighting unit.

Advantageous Effects of Invention

With the graphic sheet of the present invention, it is possible to provide a graphic sheet that can be used in an internally lit signboard. Since the receptor layer that contains an acrylic polymer contains a white pigment filler in an amount of not less than 5 parts by mass and not greater than 50 parts by mass per 100 parts by mass of the acrylic polymer, good whiteness can be imparted to the receptor layer, and good color development of the printing ink printed on the receptor layer can be exhibited. In addition, since the receptor layer is provided on the transparent rigid film substrate, the rigidity of the graphic sheet can be maintained. Therefore, the handleability is enhanced, and the installation operation in a lighting unit or the like also becomes easy. Further, by combining the graphic sheet of the present invention and a lighting unit, a lighting system that can be used as an internally lit signboard can be provided.

DESCRIPTION OF EMBODIMENTS

Hereinafter, representative embodiments of the present disclosure will be described in more detail. However, the present disclosure is not limited to these embodiments.

In the present disclosure, an "internally lit signboard" refers to a graphic display device used by installing a graphic sheet or the like on a lighting unit that can be used with both indoor and outdoor lighting, and refers to a device that is primarily used for various advertisements, guide displays, company name displays, or the like. An image can be displayed by turning on the light source inside the lighting unit or under natural light outdoors or indoor lighting without turning on the light source of the lighting unit.

In the present disclosure, "(meth)acrylic" refers to acrylic or methacrylic, and "(meth)acrylate" refers to acrylate or methacrylate.

In the present disclosure, a "graphic sheet" refers not only to a sheet on which graphics such as characters, figures, symbols, colors, patterns, or designs are printed, but also a sheet prior to printing. Note that "sheet" is a concept which also includes films.

In the present disclosure, a "receptor layer" refers to a layer which receives ink with which a printed image is formed. A layer in a state in which ink has not been received prior to printing is also called an ink receptor layer. In addition, a "solvent-based" printing ink in the present disclosure refers to a non-aqueous printing ink.

In the present disclosure, "transparent" means that the average transmittance in the visible light region (400 to 800 nm) is not less than approximately 60%, preferably not less than approximately 80%, and more preferably not less than approximately 90%.

In the present disclosure, "total light transmittance" and "haze" are values measured in accordance with JIS K 7361-1:1997 (ISO 13468-1:1996) and JIS K 7136:2000 (ISO 14782:1999), respectively, and can be measured using a haze meter (HM-150 haze meter manufactured by Murakami Color Research Laboratory Co., Ltd.), for example.

A graphic sheet according to an embodiment of the present disclosure will be described hereinafter. The graphic sheet of the present disclosure includes: a transparent rigid film substrate; and a receptor layer disposed on the transparent rigid film substrate, the receptor layer containing an acrylic polymer and a white pigment filler. Graphics are printed on the surface of the receptor layer as necessary. The graphic sheet of the present disclosure can be attached to a lighting unit and used as an internally lit signboard or the like.

Figure 1:
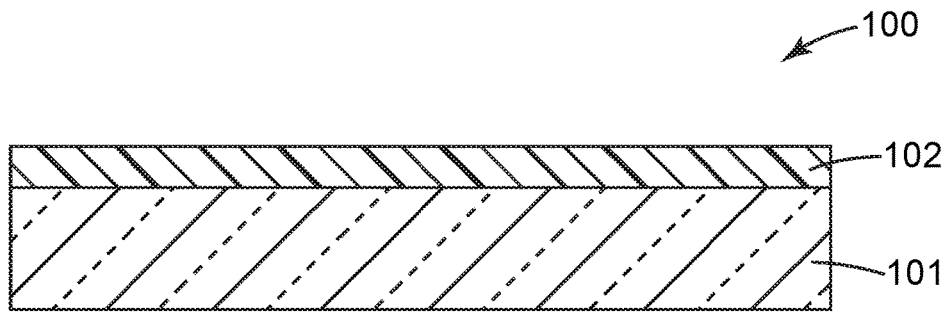
FIG. 1 is a cross-sectional view illustrating a structural example of an embodiment of the graphic sheet of the present invention.
Figure 2:
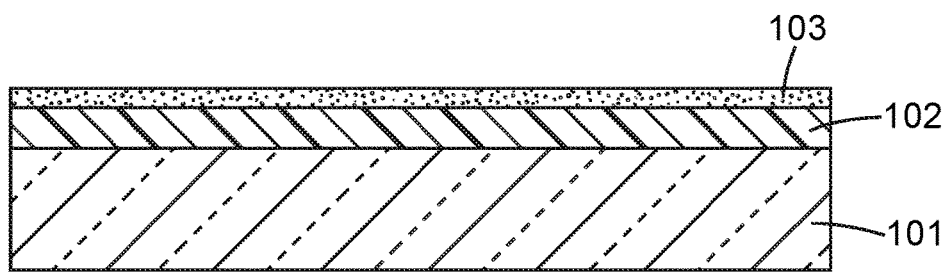
FIG. 2 is a cross-sectional view illustrating another structural example of an embodiment of the graphic sheet of the present invention.

FIG. 1 illustrates a schematic cross-sectional view of a graphic sheet 100 according to an embodiment of the present disclosure. The graphic sheet 100 includes at least a transparent rigid film substrate 101 and a receptor layer 102. As illustrated in FIG. 2, a printed layer 103 is formed on the receptor layer 102.

The receptor layer contains an acrylic polymer and a white pigment filler. The receptor layer of one embodiment contains not less than 5 parts by mass and not more than 50 parts by mass of a white pigment per 100 parts by mass of the acrylic polymer, and a milky white translucent sheet with a total visible light transmittance of not less than 8% and not greater than 50% over the entire graphic sheet can be obtained. With such a configuration, a clear printed image can be reproduced with an internally lit signboard using the graphic sheet of this embodiment as a result of the formation of a printed image on the milky white receptor layer both under internal and external lighting. In particular, when the whiteness of the receptor layer is high, the clear reproduction of skin color in a facial photograph or the like of a person becomes possible.

With the graphic sheet according to one embodiment, the color of the graphic sheet itself can be made milky white by making the receptor layer milky white. Since a white layer other than the receptor layer is not absolutely necessary, it is unnecessary to whiten the rigid film substrate, so a highly versatile transparent film can be used as a rigid film substrate. In addition, as in conventional cases, there is no need to use a white adhesive layer, so the graphic sheet may have no adhesive layer. Further, even when an adhesive layer is included, there is no need to whiten the adhesive layer, so either a transparent or a white adhesive layer may be used.

Each of the main components of the graphic sheet according to one embodiment will be described in detail hereinafter.

Receptor Layer

In one embodiment, the receptor layer is a non-adhesive resin composition containing an acrylic polymer and a white pigment filler. Examples of resins contained in such a resin composition include acrylic resins, acrylic urethane resins, urethane resins, polyester resins, vinyl acetate resins, polyvinyl chloride resins, and polystyrene resins.

In one embodiment, the receptor layer may use a (meth)acrylic film containing an acrylic resin. The (meth)acrylic film contains a polymer blend of a carboxyl group-containing (meth)acrylic polymer and an amino group-containing (meth)acrylic polymer, and a white pigment. A (meth)acrylic film containing such a polymer blend exhibits high tensile strength and excellent elongation properties. In addition, by blending a carboxyl group-containing (meth)acrylic polymer and an amino group-containing (meth)acrylic polymer, the amino group-containing (meth)acrylic polymer functions as a dispersant so that the dispersibility of the white pigment can be increased. As a result, the white pigment can be contained roughly uniformly in the receptor layer in a relatively large amount of not less than approximately 5 parts by mass per 100 parts by mass of the acrylic polymer. Therefore, the whiteness of the receptor layer can be increased, and the clarity and concealment of a printed image formed on the receptor layer can be enhanced. In addition, as a result of the enhancement of the dispersibility of the white pigment, the thickness of the receptor layer can be effectively reduced without reducing the concealment. Further, by adjusting the amount of the white pigment in the receptor layer to not more than approximately 50 parts by mass per 100 parts by mass of the acrylic polymer, the receptor layer can be kept a translucent milky white color and can be used as an internally lit signboard.

As necessary, the polymer blend can also be formed by mixing one type or two or more types of carboxyl group-containing (meth)acrylic polymers and one type or two or more types of amino group-containing (meth)acrylic polymers.

The carboxyl group-containing (meth)acrylic polymer contains a monoethylenically unsaturated monomer as a main component and can be obtained by copolymerizing the monoethylenically unsaturated monomer and a monoethylenically unsaturated monomer containing a carboxyl group (carboxyl group-containing monoethylenically unsaturated monomer). Monoethylenically unsaturated monomers are the main components of a polymer, and in addition to substances typically expressed by the formula $CH_2=CR'COOR^2$ (wherein $R^1$ is hydrogen or a methyl group, and $R^2$ is a straight-chain, cyclic, or branched alkyl group, phenyl group, alkoxyalkyl group, phenoxyalkyl group, hydroxyalkyl group, or cyclic ether group), examples include aromatic vinyl monomers such as styrene, α-methylstyrene, and vinyl toluene, vinyl esters such as vinyl acetate, and unsaturated nitrile groups such as acrylonitrile and methacrylonitrile. Examples of monoethylenically unsaturated monomers expressed by the formula $CH_2=CR^1COOR^2$ include alkyl (meth)acrylates such as methyl(meth)acrylate, ethyl (meth)acrylate, n-butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, dodecyl (meth)acrylate, cyclohexyl (meth)acrylate, and isobornyl (meth)acrylate; phenoxyalkyl (meth)acrylates such as phenoxyethyl (meth)acrylate; alkoxyalkyl (meth)acrylates such as methoxypropyl (meth)acrylate and 2-methoxybutyl (meth)acrylate; hydroxyalkyl (meth)acrylates such as 2-hydroxyethyl (meth)acrylate, 2-hydroxypropyl (meth)acrylate, and 4-hydroxybutyl (meth)acrylate; and cyclic ether-containing (meth)acrylates such as glycidyl (meth)acrylate and tetrahydrofurfuryl (meth)acrylate. One type or two or more types of monoethylenically unsaturated monomers can be used as necessary.

Examples of carboxyl group-containing monoethylenically unsaturated monomers include unsaturated monocarboxylic acids such as acrylic acid, methacrylic acid, and crotonic acid; unsaturated dicarboxylic acids such as itaconic acid, fumaric acid, citraconic acid, and maleic acid; ω-carboxy polycaprolactone monoacrylate, phthalic acid monohydroxyethyl (meth)acrylate, β-carboxyethyl acrylate, 2-(meth)acryloyl oxyethyl succinic acid, and 2-(meth)acryloyl oxyethyl hexahydrophthalic acid.

The carboxyl group-containing (meth)acrylic polymer can be obtained, for example, by copolymerizing the monoethylenically unsaturated monomer at a ratio of not less than approximately 80 parts by mass, not less than approximately 85 parts by mass, or not less than approximately 90 parts by mass and not more than approximately 99.5 parts by mass, not more than approximately 99 parts by mass, or not more than approximately 95 parts by mass and the carboxyl group-containing monoethylenically unsaturated monomer at a ratio of not less than approximately 0.5 parts by mass, not less than approximately 1 part by mass, or not less than approximately 5 parts by mass and not more than approximately 20 parts by mass, not more than approximately 15 parts by mass, or not more than approximately 10 parts by mass.

The amino group-containing (meth)acrylic polymer contains a monoethylenically unsaturated monomer as a main component and can be obtained by copolymerizing the monoethylenically unsaturated monomer and an amino group-containing unsaturated monomer. The amino group-containing (meth)acrylic polymer not only functions as a dispersant for the white, but also interacts with the carboxyl group-containing (meth)acrylic polymer to produce an effect of enhancing the strength of the receptor layer. As in the case of the carboxyl group-containing (meth)acrylic polymer, one type or two or more types of monoethylenically unsaturated monomers can be used as necessary.

Examples of amino group-containing unsaturated monomers include dialkylaminoalkyl (meth)acrylates such as N,N-dimethylaminoethyl acrylate (DMAEA) and N,N-dimethylaminoethyl methacrylate (DMAEMA); dialkylaminoalkyl (meth)acrylamides such as N,N-dimethylaminopropyl acrylamide (DMAPAA) and N,N-dimethylaminopropyl methacrylamide; and dialkylaminoalkyl vinyl ethers such as N,N-dimethylamino ethyl vinyl ether and N,N-diethylamino ethyl vinyl ether. Examples of other amino group-containing unsaturated monomers include monomers having tertiary amino groups such as vinyl monomers having nitrogen-containing heterocycles such as vinyl pyridine and vinyl imidazole, and styrenes containing tertiary amino groups (for example, 4-(N,N-dimethylamino)-styrene, 4-(N,N-diethylamino)-styrene, and the like). The amino group-containing unsaturated monomer is preferably an unsaturated monomer containing a tertiary amino group. One type or two or more types of amino group-containing unsaturated monomers can be used as necessary.

The amino group-containing (meth)acrylic polymer can be obtained, for example, by copolymerizing the monoethylenically unsaturated monomer at a ratio of not less than approximately 80 parts by mass, not less than approximately 85 parts by mass, or not less than approximately 90 parts by mass and not more than approximately 99.5 parts by mass, not more than approximately 99 parts by mass, or not more than approximately 95 parts by mass and the amino group-containing unsaturated monomer at a ratio of not less than approximately 0.5 parts by mass, not less than approximately 1 part by mass, or not less than approximately 5 parts by mass and not more than approximately 30 parts by mass, not more than approximately 20 parts by mass, or not more than approximately 10 parts by mass. By setting the amount of the amino group-containing unsaturated monomer to within the range described above, good compatibility can be achieved with the carboxyl group-containing (meth)acrylic polymer.

The compounded amount of the carboxyl group-containing (meth)acrylic polymer is not less than approximately 10 parts by mass, not less than approximately 20 parts by mass, or not less than approximately 30 parts by mass and not more than approximately 90 parts by mass, not more than approximately 80 parts by mass, or not more than approximately 70 parts by mass when the total amount of the acrylic polymer in the receptor layer is defined as 100 parts by mass.

The compounded amount of the amino group-containing (meth)acrylic polymer is not less than approximately 10 parts by mass, not less than approximately 20 parts by mass, or not less than approximately 30 parts by mass and not more than approximately 90 parts by mass, not more than approximately 80 parts by mass, or not more than approximately 70 parts by mass when the total amount of the acrylic polymer in the receptor layer is defined as 100 parts by mass.

In some embodiments, the glass transition temperature (Tg) of the carboxyl group-containing (meth)acrylic polymer is not lower than approximately −60° C., not lower than approximately −50° C., or not lower than approximately −40° C. and not higher than approximately 120° C., not higher than approximately 100° C., or not higher than approximately 80° C.

In some embodiments, the glass transition temperature (Tg) of the amino group-containing (meth)acrylic polymer is not lower than approximately −60° C., not lower than approximately −50° C., or not lower than approximately −40° C. and not higher than approximately 120° C., not higher than approximately 100° C., or not higher than approximately 80° C.

When the Tg of the carboxyl group-containing (meth)acrylic polymer is not lower than 0° C. in the polymer blend of the carboxyl group-containing (meth)acrylic polymer and the amino group-containing (meth)acrylic polymer, the Tg of the amino group-containing (meth)acrylic polymer is preferably not higher than 0° C., and when the Tg of the former is not higher than 0° C., the Tg of the latter is preferably not lower than 0° C. A (meth)acrylic polymer having a high Tg imparts high tensile strength to the film, while a (meth)acrylic polymer having a low Tg enhances the elongation properties of the film at low temperatures, so a (meth)acrylic film having excellent toughness and an excellent balance between tensile strength and elongation properties can be provided.

A (meth)acrylic polymer having a Tg of not lower than 0° C. can be obtained, for example, by performing copolymerization using a monoethylenically unsaturated monomer that would yield a homopolymer having a Tg of not lower than 0° C. when polymerized alone, such as methyl methacrylate (MMA) or n-butyl methacrylate (BMA), as a main component.

A (meth)acrylic polymer having a Tg of not higher than 0° C. can be obtained, for example, by performing copolymerization using a monoethylenically unsaturated monomer that would yield a homopolymer having a Tg of not higher than 0° C. when polymerized alone, such as ethyl acrylate (EA), n-butyl acrylate (BA), or 2-ethyl hexyl acrylate (2EHA), as a main component.

Here, the glass transition temperature (Tg) of the carboxyl group-containing (meth)acrylic polymer and the amino group-containing (meth)acrylic polymer can be found from the Fox equation (shown below), assuming that each of the polymers is copolymerized from n types of monomers.

When forming the (meth)acrylic film, the compounding ratio of each (meth)acrylic polymer can be altered to obtain a film having the desired tensile strength and elongation properties. Specifically, the compounding ratio of a (meth) acrylic polymer having a Tg of not lower than 0° C. and a (meth)acrylic polymer having a Tg of not higher than 0° C. may be from 10:90 to 90:10, from 20:80 to 90:10, from 30:70 to 90:10, or from 50:50 to 90:10. The amount of the (meth)acrylic polymer having a Tg of not lower than 0° C. is preferably greater in that the blocking of the film becomes less likely to occur.

The weight-average molecular weight of the carboxyl group-containing (meth)acrylic polymer and the amino group-containing (meth)acrylic polymer is typically not less than approximately 10,000, not less than approximately 20,000, or not less than approximately 30,000 and not greater than approximately 2,000,000, not greater than approximately 1,500,000, or not greater than approximately 1,000,000, respectively. The weight-average molecular weight in the present disclosure refers to the molecular weight in terms of standard polystyrene according to the GPC method.

From the perspective of achieving a good balance between the dispersibility of the white pigment and the toughness of the film, it is advantageous for the weight-average molecular weight of one of the carboxyl group-containing (meth)acrylic polymer or the amino group-containing (meth)acrylic polymer to be not less than approximately 20,000, not less than approximately 30,000, or not less than approximately 40,000 and not greater than approximately 2,000,000, not greater than approximately 1,400,000, or not greater than approximately 800,000 and for the weight-average molecular weight of the other to be not less than approximately 40,000, not less than approximately 50,000, or not less than approximately 60,000 and not greater than approximately 1,000,000, not greater than approximately 800,000, or not greater than approximately 600,000. In one embodiment, the weight-average molecular weight of one of the carboxyl group-containing (meth) acrylic polymer or the amino group-containing (meth) acrylic polymer is not less than approximately 800,000, not less than approximately 1,000,000, or not less than approximately 1,200,000. The receptor layer of this embodiment has particularly excellent toughness.

The copolymerization of these polymers is preferably performed by radical polymerization, and a known polymerization method such as solution polymerization, suspension polymerization, emulsion polymerization, or bulk polymerization may be used. Examples of initiators that can be used include organic peroxides such as benzoyl peroxide, lauroyl peroxide, and bis(4-tert-butylcyclohexyl) peroxydicarbonate, and azo-based polymerization initiators such as 2,2'-azobis-isobutyronitrile, 2,2'-azobis(2-methylbutyronitrile), dimethyl-2,2-azobis(2-methylpropionate), 4,4'-azobis(4-cyanovaleric acid), dimethyl 2,2'-azobis(2-methylpropionate), and azobis(2,4-dimethylvaleronitrile) (AVN). The initiator is generally used in an amount of not less than approximately 0.01 parts by mass or not less than approximately 0.05 parts by mass, and not greater than approximately 5 parts by mass or not greater than approximately 3 parts by mass relative to 100 parts by mass of the monomer mixture.

In an embodiment using a polymer blend of a carboxyl group-containing (meth)acrylic polymer and an amino group-containing (meth)acrylic polymer, the compounded amount of the white pigment may be not less than approximately 8 parts by mass, not less than approximately 15 parts by mass, or not less than approximately 25 parts by mass and not greater than approximately 150 parts by mass, not greater than approximately 100 parts by mass, or not greater than approximately 60 parts by mass per total of 100 parts by mass of the carboxyl group-containing (meth)acrylic polymer and the amino group-containing (meth)acrylic polymer.

Examples of the white pigment contained in the receptor layer include conventionally known pigments such as zinc carbonate, zinc oxide, zinc sulfide, and titanium oxide (titanium dioxide). The white pigment may be used alone or as a mixture of two or more types thereof. These white pigments may be particles of various shapes such as spherical, needle-shaped, tabular, or flake-like particles, and spherical particles are preferable in that the dispersibility is good. The white pigments may be surface-treated with a coupling agent such as a silane or titanate to further enhance dispersibility.

The average primary particle size of the white pigment is typically not less than approximately 0.10 μm, not less than approximately 0.12 μm, or not less than approximately 0.15 μm and not greater than approximately 0.50 μm, not greater than approximately 0.40 μm, or not greater than approximately 0.30 μm. By setting the average primary particle size of the white pigment to within the range described above, the white pigment can be dispersed more uniformly in the receptor layer. The average primary particle size of the white pigment is the volume cumulative particle size $D_{50}$, which can be determined using laser diffraction/scattering type particle size distribution measurements.

The compounded amount of the white pigment may be not less than approximately 5 parts by mass, not less than approximately 10 parts by mass, or not less than approximately 20 parts by mass per total of 100 parts by mass of the acrylic polymers in the receptor layer. In this case, the whiteness required to express good coloring of the printing ink can be increased, and concealment and clarity of the printed image can be achieved. In addition, the compounded amount of the white pigment may be not greater than approximately 50 parts by mass, not greater than approximately 40 parts by mass, or not greater than approximately 30 parts by mass per total of 100 parts by mass of the acrylic polymers of the receptor layer, which makes it possible to set the transmittance of the entire sheet combining the receptor layer and the transparent rigid film substrate to a range in which the sheet can be used in an internally lit signboard.

In an embodiment in which titanium dioxide is used as a white pigment, an amino group-containing (meth)acrylic polymer not containing monomer units derived from aromatic vinyl monomers can be suitably used as an amino group-containing (meth)acrylic polymer. Such an amino group-containing (meth)acrylic polymer is one of the amino group-containing (meth)acrylic polymers not containing an aromatic vinyl monomer as a polymer component. Aromatic vinyl monomers include styrene, α-methylstyrene, vinyl toluene, vinyl naphthalene, vinyl anthracene, vinyl anthraquinone, (meth)acrylamides of aromatic amines, (meth) acrylates of hydroxyl group-containing aromatic compounds, and the like. Examples of aromatic amines include aniline, benzyl amine, naphthyl amine, amino anthracene, amino anthraquinone, or derivatives thereof. Examples of hydroxyl group-containing aromatic compounds are hydroxyl group-containing compounds corresponding to the aromatic amines described above. An amino group-containing (meth)acrylic polymer not containing monomer units derived from aromatic vinyl monomers is particularly advantageous for enhancing the dispersibility of titanium dioxide.

The white pigment may be added at the time of the production of the receptor layer in the form of a colorant dispersed into a dispersant made of any of the amino group-containing (meth)acrylic polymers or the hydroxyl group-containing (meth)acrylic polymers described above. By preparing a colorant, the white pigment can be more uniformly and easily dispersed in the receptor layer.

When an amino group-containing (meth)acrylic polymer is used as a dispersant, the weight-average molecular weight of the amino group-containing (meth)acrylic polymer is preferably not less than approximately 2,000, not less than approximately 5,000, or not less than approximately 10,000 and not greater than approximately 200,000, not greater than approximately 150,000, or not greater than approximately 100,000. The amino group-containing (meth)acrylic polymer of the dispersant may be the same as or different than the amino group-containing (meth)acrylic polymer of the polymer blend. The amino group-containing (meth)acrylic polymer of the polymer blend may also be used as a dispersant.

A hydroxyl group-containing (meth)acrylic polymer contains a monoethylenically unsaturated monomer as a main component and can be obtained by copolymerizing the monoethylenically unsaturated monomer and a hydroxyl group-containing unsaturated monomer. As in the case of the carboxyl group-containing (meth)acrylic polymer, one type or two or more types of monoethylenically unsaturated monomers can be used as necessary, with the exception of hydroxyalkyl (meth)acrylate.

Examples of hydroxyl group-containing unsaturated monomers include the "Placcel F" series (manufactured by Daicel ChemTech, Inc.), which are polycaprolactone-modified products of hydroxyalkyl (meth)acrylates (for example, 2-hydroxyethyl (meth)acrylate, 3-hydroxypropyl (meth) acrylate, 2-hydroxypropyl (meth)acrylate, 4-hydroxybutyl (meth)acrylate, and the like), glycerin mono(meth)acrylate, 2-hydroxy-3-phenoxypropyl (meth)acrylate, and 2-hydroxyethyl (meth)acrylate. One type or two or more types of hydroxyl group-containing unsaturated monomers can be used as necessary.

The hydroxyl group-containing (meth)acrylic polymer can be obtained, for example, by copolymerizing the monoethylenically unsaturated monomer at a ratio of not less than approximately 80 parts by mass, not less than approximately 85 parts by mass, or not less than approximately 90 parts by mass and not more than approximately 99.5 parts by mass, not more than approximately 99 parts by mass, or not more than approximately 95 parts by mass and the hydroxyl group-containing unsaturated monomer at a ratio of not less than approximately 0.5 parts by mass, not less than approximately 1 part by mass, or not less than approximately 5 parts by mass and not more than approximately 30 parts by mass, not more than approximately 20 parts by mass, or not more than approximately 10 parts by mass.

The carboxyl group-containing (meth)acrylic polymer and/or the amino group-containing (meth)acrylic polymer may be crosslinked with a crosslinking agent. The solution resistance is enhanced by crosslinking using a crosslinking agent. Examples of crosslinking agents that may be used for the carboxyl group-containing (meth)acrylic polymer include bisamide crosslinking agents (for example, 1,1'-isophthaloyl-bis(2-methylaziridine)), aziridine crosslinking agents (for example, Chemitite PZ33 manufactured by Nippon Shokubai Co., Ltd. And NeoCryl CX-100 manufactured by Avecia), carbodiimide crosslinking agents (for example, Carbodilite V-03, V-05, and V-07 manufactured by Nisshinbo Chemical Inc.), epoxy crosslinking agents (for example, E-AX, E-5XM, and E5C manufactured by Soken Chemical), and isocyanate crosslinking agents (for example, Coronate L and Coronate HK manufactured by Nippon Polyurethane Industry Co., Ltd. and Desmodule H, Desmodule W, and Desmodule I manufactured by Bayer). Examples of crosslinking agents that may be used for the amino group-containing (meth)acrylic polymer include epoxy crosslinking agents (for example, E-AX, E-5XM, and E5C manufactured by Soken Chemical) and isocyanate crosslinking agents (for example, Coronate L and Coronate HK manufactured by Nippon Polyurethane Industry Co., Ltd. and Desmodule H, Desmodule W, and Desmodule I manufactured by Bayer).

The added amount of the crosslinking agent may be not less than approximately 0.01 equivalents, not less than approximately 0.02 equivalents, or not less than approximately 0.05 equivalents and not greater than approximately 0.5 equivalents, not greater than approximately 0.3 equivalents, or not greater than approximately 0.2 equivalents with respect to the carboxyl groups in the carboxyl group-containing (meth)acrylic polymer or the amino groups in the amino group-containing (meth)acrylic polymer.

The receptor layer may also contain fillers such as talc, kaolin, calcium carbonate, aluminum flakes, fumed silica, alumina, or nanoparticles, antioxidants, UV absorbers, UV stabilizers, plasticizers, lubricants, antistatic agents, flame retardants, or the like as other components.

The receptor layer can be formed, for example, by applying the resin composition described above to a release liner and then drying the composition, or by melt extrusion molding. For example, in an embodiment using the (meth) acrylic film described above, the receptor film can be formed on the transparent rigid film substrate by mixing the polymer blend, white pigment, and other optional components to achieve an appropriate viscosity using a volatile solvent such as toluene or ethyl acetate as necessary, applying the mixture to the release surface of a release liner by means of knife coating, bar coating, or the like, and drying the mixture.

The thickness of the receptor layer is not particularly limited, but since the receptor layer contains a white pigment and has a milky white color, the receptor layer has an effect on the total visible light transmittance of the entire graphic sheet. Therefore, from the perspective of keeping the total visible light transmittance of the graphic sheet at or above a certain level and achieving an appropriate image brightness with internal lighting, the thickness is preferably not greater than approximately 50 µm, more preferably not greater than approximately 45 µm, and even more preferably not greater than approximately 40 µm. On the other hand, to maintain the function as a receptor layer and to achieve good image quality with external lighting, it is advantageous for the thickness to be not less than approximately 10 µm, not less than approximately 20 µm, or not less than approximately 30 µm.

Transparent Rigid Film Substrate

The transparent rigid film substrate functions as a support for the graphic sheet and can impart the graphic sheet with rigidity that is difficult to achieve with the receptor layer alone.

The visible light transmittance of the transparent rigid film substrate is not less than 85%, preferably not less than 90%, and more preferably not less than 95%. By setting the visible light transmittance to not less than 85%, it is possible to provide good image quality as an internally lit signboard without diminishing the whiteness of the receptor layer or the color or brightness of the printed layer formed on the receptor layer. In addition, when the graphic sheet is used by turning on the lighting of the internal lighting unit (internal lighting), a bright screen can be provided without diminishing the illuminance of the lighting.

The transparent rigid film substrate preferably functions as a support for the graphic sheet and has a degree of rigidity that prevents deformation or bending from occurring easily under its own weight when an operator picks up the graphic sheet. In this case, the workability can be enhanced when performing operations such as the installation of a lighting unit using the graphic sheet.

In some embodiments, the thickness of the transparent rigid film substrate may be not less than approximately 30 µm, not less than approximately 40 µm, or not less than approximately 50 µm. In addition, the thickness of the transparent rigid film substrate may be not greater than approximately 300 µm, not greater than approximately 200 µm, or not greater than approximately 100 µm. By setting the thickness of the transparent rigid film substrate to within the range described above, the shape of the entire graphic sheet can be easily maintained in combination with the rigidity of the film itself, while the sheet is imparted with moderate flexibility to as to increase the workability when installing or removing the graphic sheet on or from a lighting system. Note that when the thickness of the transparent rigid film substrate differs within the plane, the thickness of the transparent rigid film substrate in the present disclosure refers to the minimum thickness of the transparent rigid film substrate.

In some embodiments, the yield modulus of the transparent rigid film substrate is not less than approximately 10 MPa, not less than approximately 15 MPa, or not less than approximately 20 MPa and not greater than approximately 300 MPA, not greater than approximately 250 MPa, or not greater than approximately 200 MPa. By setting the yield modulus of the transparent rigid film substrate to within the range described above, the rigidity can be maintained to a degree that deformation or bending does not occur easily under its own weight, and moderate flexibility can be achieved, so the attachment operation to an internal lighting unit can be enhanced. Note that the yield modulus is defined as the elasticity modulus at the yield point when a test piece is produced by cutting a rigid resin film into a rectangle 15 mm wide and 100 mm long and the elongation properties of the test piece are measured in accordance with JIS K7127 using a tension tester under conditions at 20° C., a spacing of 50 mm between grips, and a tension rate of 300 mm/min.

In some embodiments, the product of the yield modulus and the thickness of the transparent rigid film substrate is not less than approximately $0.3 \times 10^4$ N/m, not less than approximately $0.5 \times 10^4$ N/m, or not less than approximately $1.0 \times 10^4$ N/m and not greater than approximately $5 \times 10^4$ N/m, not greater than approximately $5 \times 10^4$ N/m, or not greater than approximately $3 \times 10^4$ N/m. The product of the yield modulus and the thickness is proportional to the bending stiffness of the transparent rigid resin film substrate. By setting the product of the yield modulus and the thickness of the transparent rigid film substrate to within the range described above, the rigidity can be maintained to a degree that deformation or bending does not occur easily under its own weight.

In some embodiments, the 2% tensile strength of the transparent rigid film substrate is not less than approximately 40 N/25 mm, not less than approximately 45 N/25 mm, or not less than approximately 50 N/25 mm. By setting the 2% tensile strength of the transparent rigid film substrate to within the range described above, the rigidity can be maintained to a degree that deformation or bending does not occur easily under its own weight. The 2% tensile strength is defined as a tensile strength at 2% strain when a test piece is produced by cutting a transparent rigid film substrate into a rectangle 25 mm wide and 100 long and measured using a tensile tester under conditions at and subjected to measurement using a tension tester under conditions at 20° C., a spacing of 50 mm between grips, and a tension rate of 300 mm/min.

The material of the transparent rigid film substrate is not particularly limited, but examples thereof include polyesters such as polyethylene terephthalate and polyethylene naphthalate, polyolefins such as polyethylene and polypropylene, polycarbonates, acrylic resins, fluororesins such as polytetrafluoroethylene, and polyvinylidene fluoride. A polyester film is advantageously used as the transparent rigid film substrate since the polyester film has high yield modulus and strength, has excellent weather resistance, and is relatively inexpensive.

The transparent rigid film substrate may be a stretched film or an unstretched film. The rigidity and tensile strength of the film can be advantageously enhanced by using a stretched film, especially a biaxially stretched film, as the transparent rigid film substrate.

The transparent rigid film substrate may contain other optional components such as fillers, colorants, UV absorbing agents, and antioxidants, for example, within a range that does not diminish the transparency thereof.

Printed Layer

In some embodiments, a printed layer is provided on a surface on the opposite side as the transparent rigid film substrate side of the receptor layer, and a graphical image is formed by this printed layer. The graphical image is not limited and includes characters, figures, or photographic images such as scenery or people used in various advertisements, guide displays, and company name displays. The method of forming the printed layer is not limited, and various methods such as screen printing, inkjet printing, or electrostatic printing may be used. In some embodiments, inkjet printing can be preferably used from the perspectives of good resolution, flexibility, high speed, and low cost. In addition, as the ink used in inkjet printing, a solvent-based ink which has good water resistance and weather resistance and has good ink fixing properties with respect to the aforementioned receptor layer containing acrylic polymers can be preferably used. Examples of such solvent inks that can be used include solvent-based inks "ECO-SOL MAX"

available from Roland, HS ink, Eco-HS1 ink, ES3 ink, and SS21 ink available from Mimaki, GS3 ink, GSX ink, and LUS-200 ink available from EPSON, Latex ink available from HP, XS ink, EG-Outdoor-GXII ink, and SX 3M ink available from OKI Data Infotech Co., Ltd., and 2200 UV ink and 2800 UV ink available from EFI VUTEK.

The graphic sheet of this embodiment can be produced by various methods. In some embodiments, a transparent rigid film substrate is first prepared. On the other hand, a receptor/white pigment mixed solution is prepared by mixing an acrylic polymer and a white pigment filler. Note that additives such as dispersants or crosslinking agents may be added as necessary to the receptor/white pigment mixed solution. This receptor/white pigment mixed solution is coated onto a transparent rigid film substrate to a prescribed thickness using a knife coater or the like. A receptor layer is formed on a transparent rigid film by heating and drying a receptor layer precursor obtained in this way. Alternatively, a receptor layer precursor may be formed on the transparent rigid film by performing molten extrusion molding on the receptor/white pigment mixed solution onto the transparent rigid film.

Other Aspects

In some embodiments, a back layer containing microspheres and a non-adhesive resin may be provided on the surface on the opposite side as the receptor layer side of the transparent rigid film substrate. When an image is printed on the receptor layer by inkjet printing, the graphic sheet may be wound or stacked immediately after printing. However, when the printed surface and the back surface of the graphic sheet come into contact immediately after printing, blocking may occur on the printed surface, or the transfer of ink to the back surface of the graphic sheet may become problematic. A back layer formed on the transparent rigid film substrate is effective in preventing such blocking or the transfer of ink.

The microspheres contained in the back layer are microparticles made of an organic material or an inorganic material and are preferably non-adhesive. Specifically, microparticles made of polyester resins, polystyrene resins, acrylic resins, urethane resins, silica, or glass, for example, may be used. The shape is preferably spherical from the perspective of preventing blocking or the transfer of ink. In addition, the microspheres are preferably crosslinked particles from the perspective of solvent resistance. Further, hollow particles may also be used.

The volume cumulative particle size D50 of the microspheres is particularly not less than approximately 15 µm or not less than approximately 20 µm and not greater than approximately 40 µm or not greater than approximately 30 µm. The volume cumulative particle size D50 of the microspheres can be determined using laser diffraction/scattering type particle size distribution measurements.

Examples of the non-adhesive resin contained in the back layer include silicone resins, epoxy resins, melamine resins, alkyd resins, alkyd/melamine resins, and butyl etherified urea-formaldehyde resins.

The mass ratio of the microspheres and the non-adhesive resin in the back layer is preferably approximately 45-180:100. When the added amount of the microspheres is smaller than this, protrusions due to the microspheres tend to encroach into the printed surface, which may cause impressions or the shedding of the printed layer. On the other hand, when the added amount of the microspheres is greater than this, the proportion of contact with the printed layer (printed surface) becomes large, and there is a risk of the shedding of the printed layer or a reduction in glossiness.

The thickness of the back layer is not particularly limited, but the thickness of the thickest portion of the back layer from the transparent rigid film substrate surface may be not less than approximately 10 µm and not greater than approximately 50 µm, and the thickness of the thinnest portion of the back layer from the transparent rigid film substrate may be not less than approximately 5 µm and not greater than approximately 40 µm.

The back layer can be obtained by adding and mixing the microspheres to the non-adhesive resin, applying the microspheres to the transparent rigid film substrate surface with a conventionally known method such as knife coating, and then drying.

(Lighting System)

A lighting system that can be used as an internally lit signboard can be obtained by attaching the graphic sheet of the present disclosure to the surface of a lighting unit including a case with an internal light source. This lighting system can be used indoors or outdoors as various advertisements, guide displays, company name displays, as well as a graphic display device. The light source used in the lighting unit is not limited, and various light displays such as a fluorescent lamp, a neon tube, or an LED may be used, but an LED is preferably used from the perspectives of energy saving and reducing size and weight.

Figure 3:
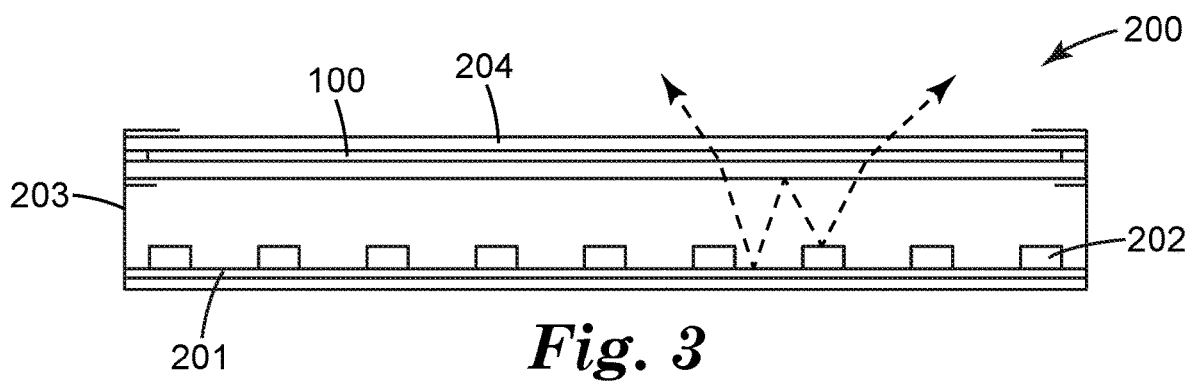
FIG. 3 is a cross-sectional view illustrating a structural example of an embodiment of a lighting system using the graphic sheet of the present invention.

FIG. 3 illustrates a schematic cross-sectional view of an embodiment of a lighting system 200 using an LED as a light source. As illustrated in the drawing, the lighting system 200 has multiple LED modules 202 disposed on the inner surface (lower surface in the drawing) of a case 201 that constitutes a lighting unit 203 and has a display part 204 on the outer surface (upper surface in the drawing) of the case 201. Note that a reflective material may be formed on the inner surface of the case 201 in which the LED modules 202 are disposed so as to more efficiently extract the light of the LED to the display surface.

As illustrated in FIG. 3, the display part 204 may have a configuration in which a graphic sheet 100 is sandwiched by two upper and lower transparent supports or sheets such as acrylic sheets, or the graphic sheet 100 may be attached and fixed to the top of a single transparent support via an adhesive layer. In the case of a configuration in which the graphic sheet 100 is sandwiched by two upper and lower transparent supports or sheets, the graphic sheet can be easily removed, which is suitable for advertisement display requiring replacement in short periods of time.

EXAMPLES

In the following examples, specific embodiments of the present disclosure are described as examples, but the present disclosure is not limited to these embodiments. All "parts" and "percent" are based on mass unless specified otherwise.

The abbreviations shown in Table 1 are used in the present specification.

TABLE 1

| Abbreviation | Description |
|---|---|
| MMA | Methyl methacrylate |
| BMA | n-Butyl methacrylate |
| DMAEMA | Dimethylaminoethyl methacrylate |
| BA | n-Butyl acrylate |
| AA | Acrylic acid |
| 2EHA | 2-Ethylhexyl acrylate |
| MEK | Methyl ethyl ketone |

TABLE 1-continued

| Abbreviation | Description |
|---|---|
| EtAc | Ethyl acetate |
| VAc | Vinyl acetate |

<Production of Acrylic Polymer 1 (AP1) (Carboxyl Group-Containing (Meth)Acrylic Polymer)>

An EtAc solution (solid content: 60%) of an acrylic polymer 1 (AP1) was prepared by dissolving 32 parts by mass of BA, 62 parts by mass of 2EHA, and 6 parts by mass of AA in an EtAc solvent, adding 0.67 parts by mass of 2,2'-azobis(2,4-dimethylvaleronitrile) (product name: V-65, manufactured by Wako Chemical Industries, Ltd.) as a polymerization initiator, and reacting for 24 hours at 65° C. in a nitrogen atmosphere. The weight-average molecular weight (Mw) of AP1 was 280,000, and the glass transition temperature (Tg) was −57° C.

The Tg was determined by the Fox equation (below equation) assuming that each polymer is formed by copolymerization of n types of monomers. The Tg was determined thereafter with the following method.

$$1/Tg = X_1/(Tg_1 + 273.15) + X_2/(Tg_2 + 273.15) + \ldots + X_n/(Tg_n + 273.15)$$ [Mathematical Formula 1]

($Tg_1$: Glass transition temperature of homopolymer of component 1
($Tg_2$: Glass transition temperature of homopolymer of component 2
. . .
$Tg_n$: Glass transition temperature of homopolymer of component n $X_1$: Mass fraction of component 1 monomer that is added during polymerization
$X_2$: Mass fraction of component 2 monomer that is added during polymerization
. . .
$X_n$: Mass fraction of component n monomer that is added during polymerization $X_1+X_2+ \ldots +X_n=1$)

<Production of Acrylic Polymer 2 (AP2) (Carboxyl Group-Containing (Meth)Acrylic Polymer)>

An EtAc solution (solid content: 40%) of an acrylic polymer 2 (AP2) was prepared by dissolving 40 parts by mass of BA, 47 parts by mass of 2EHA, 8 parts by mass of VAc, and 5 parts by mass of AA in an EtAc solvent, adding 0.2 parts by mass of 2,2'-azobis(2,4-dimethylvaleronitrile) (product name: V-65, manufactured by Wako Chemical Industries, Ltd.) as a polymerization initiator, and reacting for 24 hours at 65° C. in a nitrogen atmosphere. The weight-average molecular weight (Mw) of AP2 was 550,000, and the glass transition temperature (Tg) was −58° C.

<Production of Polymer Dispersant (PD) (Amino Group-Containing (Meth)Acrylic Polymer)>

An EtAc solution (solid content: 40%) of an amino group-containing (meth)acrylic polymer was prepared as a polymer dispersant (PD) by dissolving 60 parts by mass of MMA, 34 parts by mass of BMA, and 6 parts by mass of DMAEMA in EtAc, adding 0.2 parts by mass of 2,2'-azobis(2,4-dimethylvaleronitrile) (product name: V-65, manufactured by Wako Chemical Industries, Ltd.) as a polymerization initiator, reacting for 24 hours at 65° C. in a nitrogen atmosphere. The weight-average molecular weight (Mw) of PD was 68,000, and the glass transition temperature (Tg) was 63° C.

The polymer compositions crosslinking agents, white pigments, and non-adhesive microspheres used in this example are shown in Table 2.

TABLE 2

| Material | Composition or description | Tg (° C.) | Weight-average molecular weight (Mw) | Solvent | Solid content (%) |
|---|---|---|---|---|---|
| Acrylic polymer 1 (AP1) | BA-2EHA-AA = 32:62:6 | −57 | 280000 | EtAc | 60 |
| Acrylic polymer 2 (AP2) | BA-2EHA-VAc-AA = 40:47:8:5 | −58 | 550000 | EtAc | 40 |
| Polymer dispersant (PD) | MMA-BMA-DMAEMA = 60:34:6 | 63 | 68000 | EtAc | 40 |
| Crosslinking agent (CL) | Epoxy-based crosslinking agent Product name: E-AX (manufactured by Soken Chemical & Engineering Co., Ltd. (Tokyo, Japan)) | — | — | Toluene | 5 |
| White pigment filler | Titanium oxide Ti-Pure (trademark) R960 (Manufactured by Dupont (United States)) | — | — | — | — |
| Transparent rigid film | Oriented polyester film having thickness of 50 μm Cosmoshine (registered trademark) A4300 (manufactured by Toyobo Co., Ltd. (Osaka, Japan)) | — | — | — | — |

*) Tg is a value calculated from the FOX formula.

Example 1

First, a white pigment mixture was prepared by mixing a white pigment filler, a polymer dispersant, and a solvent (MEK). The ratio of the white pigment filler and the polymer dispersant was 5:1. In addition, the proportion of nonvolatile components occupying the mixed solution was approximately 66%.

Next, a receptor/white pigment mixed solution was prepared by mixing this white pigment solution, acrylic polymer 1 (AP1), and the polymer dispersant (PD). The nonvolatile component ratio of PD, AP1, and the white pigment filler was 100:50:14. That is, in the receptor/white pigment mixed solution, the nonvolatile component ratio of the white pigment filler with respect to 100 parts by mass of the acrylic polymers (PD+AP1) was 9 parts by mass. Further, a cross-linking agent (CL) was added to the receptor/white pigment mixed solution at a nonvolatile component ratio of 0.70 parts by mass with respect to 100 parts by mass of AP1. The proportion of nonvolatile components in the receptor/white pigment mixed solution was approximately 35%.

Next, a transparent polyester film having a thickness of 50 µm and a visible range transmittance of 92.3% was prepared as a transparent rigid film substrate. The yield modulus of this film substrate was 116 MPa, and the 2% tensile strength was 109 N/25 mm. The product of the yield modulus and the thickness of the substrate was not less than $0.58 \times 10^4$ N/m.

The receptor/white pigment mixed solution was coated onto the polyester film with a knife coater and dried for 3 minutes at 95° C. and then for 3 more minutes at 155° C. After drying, a translucent receptor layer having a thickness of approximately 44 µm was obtained. The appearance of this receptor layer was a milky white color, and the visible range transmittance was approximately 30%.

A printed image was formed with a solvent ink (ECO-SOL MAX2 manufactured by Roland) was formed on this milky white translucent receptor layer using a solvent inkjet printer (XR-640 manufactured by Roland). The printing conditions entailed 6 colors (cyan, magenta, yellow, black, light cyan, and light magenta), dual mode, high-quality mode (720 dpi×1,440 dpi), and variable dots. An image of a facial photograph of a person was printed. The printing speed was approximately 3 m/hr, and the printing temperature was approximately 40° C. In this way, the graphic sheet of Example 1 was produced.

Example 2

A graphic sheet was produced in the same manner as in Example 1. However, the thickness of the receptor layer was set to 29 µm. The appearance of this receptor layer was a milky white color, and the transmittance was approximately 38%.

Example 3

A graphic sheet was produced in the same manner as in Example 1. However, the acrylic polymer AP1 used when preparing a receptor/white pigment mixed solution was changed to AP2, and the thickness of the receptor layer was set to approximately 38 µm. The appearance of this receptor layer was a milky white color, and the transmittance was approximately 30%.

Example 4

A graphic sheet was produced in the same manner as in Example 1. However, the acrylic polymer used when preparing a receptor/white pigment mixed solution was changed to AP2. In the receptor/white pigment mixed solution, the nonvolatile component ratio of the white pigment filler with respect to 100 parts by mass of all of the acrylic polymers (PD+AP2) was 45 parts by mass. In addition, the thickness of the receptor layer was set to 30 µm. The appearance of this receptor layer was a milky white color, and the transmittance was approximately 12%.

Example 5

A graphic sheet was produced in the same manner as in Example 1. However, the acrylic polymer AP1 used when preparing a receptor/white pigment mixed solution was changed to AP2. In the receptor/white pigment mixed solution, the nonvolatile component ratio of the white pigment filler with respect to 100 parts by mass of all of the acrylic polymers (PD+AP2) was 19 parts by mass. In addition, the thickness of the receptor layer was set to 30 µm. The appearance of this receptor layer was a milky white color, and the transmittance was approximately 23%.

Comparative Example 1

A graphic sheet was produced in the same manner as in Example 3. However, the receptor layer did not contain a white pigment filler. In addition, the thickness of the receptor layer was set to 50 µm. The appearance of this receptor layer was transparent, and the transmittance was approximately 90%.

Reference Example 1

A piece of white photograph paper "Cryspia <TM>" (manufactured by Epson) used in high-quality photographic printing was prepared as a reference example.

Evaluation Method

The crystal sheet was evaluated in accordance with the following method. The evaluation results are shown in Table 3.

1. Optical Characteristics

A test piece was prepared by cutting a graphic sheet without any printed image to 30 mm square. The total light transmittance, haze, diffused light transmittance, and parallel light transmittance were measured using a haze meter (HM-150 haze meter manufactured by Murakami Color Research Laboratory Co., Ltd.) in accordance with JIS K 7361-1:1997 (ISO 13468-1:1996) and JIS K 7136:2000 (ISO 14782:1999). The average value of three measurements was used as a representative value.

2. Internally Lit Image Quality Evaluation

A test piece was produced by cutting a graphic sheet on which an image of a facial photograph of a person was printed to a length of 150 mm and a width of 200 mm. This test piece was mounted on an internal lighting box (Eye Light Table CT1201RC, Eye Graphics Co., Ltd.) with the printed surface facing outward, and the image was confirmed visually while the light source of the internal lighting box was turned on. Cases in which the image had an image appearance (including color) equivalent to that of a case in which the same graphic sheet was placed on a piece of white paper under ordinary lighting with an indoor fluorescent lamp were assessed as "Good". Cases in which there was a difference in image appearance in comparison to the image when the graphic sheet was placed on a piece of white paper (when the color was dark or when there was unevenness in color depending on the location) were assessed as "Poor".

3. Externally Lit Image Quality Evaluation

A test piece was produced by cutting a graphic sheet on which an image of a facial photograph of a person was printed to a length of 150 mm and a width of 200 mm. This test piece was mounted on an internal lighting box (Eye Light Table CT1201RC, Eye Graphics Co., Ltd.), and the image was confirmed visually while the light source of the internal lighting box was turned on; that is, under normal lighting with an indoor fluorescent lamp. Cases in which the image appearance (including color) was equivalent to that of a case in which the same graphic sheet was placed on a piece of white paper were assessed as "Good". Cases in which there was a difference in image appearance in comparison to the image when the graphic sheet was placed on a piece of white paper were assessed as "Poor".

4. Whiteness Evaluation

A test piece was prepared by cutting a graphic sheet without any printed image to 50 mm square. This test piece was placed on a white glossy film (Scotchcal (trademark) JS1000A manufactured by 3M Japan Ltd.) and on a black glossy film (Scotchcal (trademark) JS1500A manufactured by 3M Japan Ltd.), and the Y-value (luminous reflectance) was measured using a color meter (CM-3700d spectrophotometer manufactured by Konica Minolta, Inc.). A CIE standard light source D65 was used as a light source, and the measurement angle was set to 2 degrees. The Y-value measured on the white glossy film was defined as the "Y-value on white", and the Y-value measured on the black glossy film was defined as the "Y-value on black".

The whiteness improves when the Y-value on white and the Y-value on black are higher, and the concealment can also be considered better as the "Y-value on black/Y-value on white" approaches 100%. The whiteness can be assessed to be good when the Y-value on white is 80 or higher and the value determined by dividing the Y-value on black by the Y-value on white ("Y-value on black/Y-value on white") is 70% or higher.

204: Display part
103: Printed layer

The invention claimed is:

1. A graphic sheet comprising
   a transparent rigid film substrate; and
   a receptor layer disposed on the transparent rigid film substrate, the receptor layer containing an acrylic polymer and a white pigment filler;
   wherein the receptor layer contains not less than 5 parts by mass and not more than 50 parts by mass of the white pigment filler per 100 parts by mass of the acrylic polymer; and
   a total visible light transmittance of the sheet is not less than 8% and not greater than 50%.

2. The graphic sheet according to claim 1, wherein the receptor layer has a thickness of not greater than 50 μm.

3. The graphic sheet according to claim 1, wherein the acrylic polymer contains a polymer blend of a carboxyl group-containing (meth) acrylic polymer and an amino group-containing (meth) acrylic polymer.

4. The graphic sheet according to claim 1, wherein the white pigment filler is a titanium oxide pigment.

5. The graphic sheet according to claim 1, wherein the transparent rigid film substrate has a yield modulus of not less than 10 MPa and not greater than 300 MPa.

6. The graphic sheet according to claim 1, wherein a 2% tensile strength of the transparent rigid film substrate is not less than 40 N/25 mm.

7. The graphic sheet according to claim 1, wherein the transparent rigid resin film substrate is a polyester film.

8. The graphic sheet according to claim 1, wherein the transparent rigid resin film substrate has a thickness of not less than 30 μm and not greater than 300 μm.

9. The graphic sheet according to claim 1, further comprising a printed layer on a surface on an opposite side as the transparent rigid film substrate side of the receptor layer.

TABLE 3

| | Sheet appearance color | Acrylic polymer | White pigment filler composition ratio *1) | Receptor layer thickness (μm) | Sheet transmittance (%) | Internally lit image | Externally lit image | Y-value on White Y (WH) | Y-value on Black Y (BK) | Y (BK)/ Y (WH) (%) |
|---|---|---|---|---|---|---|---|---|---|---|
| Example 1 | Milky white | AP1 + PD | 9 | 44 | 30 | Good | Good | 90 | 71 | 79 |
| Example 2 | Milky white | AP1 + PD | 9 | 29 | 38 | Good | Good | 89 | 63 | 71 |
| Example 3 | Milky white | AP2 + PD | 9 | 38 | 30 | Good | Good | 90 | 70 | 78 |
| Example 4 | Milky white | AP2 + PD | 45 | 30 | 12 | Good | Good | 90 | 86 | 96 |
| Example 5 | Milky white | AP2 + PD | 19 | 30 | 23 | Good | Good | 89 | 76 | 85 |
| Comparative Example 1 | Transparent | AP2 + PD | 0 | 50 | 90 | Poor | Poor | 83 | 12 | 15 |
| Reference Example 1 | White | ND | | ND | 0 | Bad | Good | 95 | 92 | 97 |

*1) Composition ratio of white pigment filler with respect to 100 parts by mass of all acrylic polymers (mass ratio)

REFERENCE SIGNS LIST

100: Graphic sheet
101: Transparent rigid film substrate
102: Receptor layer
200: Lighting System
201: Case
202: LED modules
203: Lighting unit 10. The graphic sheet according to claim 2, wherein the printed layer is a printed layer of a solvent based ink.

11. The graphic sheet according to claim 9, wherein the printed layer is an inkjet printed layer.

12. The graphic sheet according to claim 1, further comprising a resin layer containing microspheres and a non-adhesive resin on a surface on an opposite side as the receptor layer side of the transparent rigid film substrate.

13. A lighting system comprising the graphic sheet according to claim 1 and a lighting unit, wherein the graphic sheet is attached to the lighting unit.

14. The lighting system according to claim 13, wherein the graphic sheet is attached to the lighting unit without interposing an adhesive layer.

15. The lighting system according to claim 13, wherein the lighting unit includes a pair of transparent plates between which the graphic sheet can be replaceably sandwiched on a front part thereof.

16. The graphic sheet according to claim 1, wherein the receptor layer contains not less than 10 parts by mass by mass of the white pigment filler per 100 parts by mass of the acrylic polymer.

17. The graphic sheet according to claim 1, wherein the receptor layer contains not more than 40 parts by mass of the white pigment filler per 100 parts by mass of the acrylic polymer.

\* \* \* \* \*